US010291606B2

(12) United States Patent
Ito et al.

(10) Patent No.: US 10,291,606 B2
(45) Date of Patent: May 14, 2019

(54) AUTHENTICATION INFORMATION MANAGEMENT SYSTEM, AUTHENTICATION INFORMATION MANAGEMENT APPARATUS, RECORDING MEDIUM, AND AUTHENTICATION INFORMATION MANAGEMENT METHOD

(71) Applicant: FUJI XEROX CO., LTD., Tokyo (JP)

(72) Inventors: Kensuke Ito, Yokohama (JP); Tetsuya Kimura, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 89 days.

(21) Appl. No.: 15/152,900

(22) Filed: May 12, 2016

(65) Prior Publication Data

US 2016/0261585 A1    Sep. 8, 2016

Related U.S. Application Data

(63) Continuation of application No. PCT/JP2014/070149, filed on Jul. 31, 2014.

(30) Foreign Application Priority Data

Mar. 11, 2014    (JP) ................................ 2014-047107

(51) Int. Cl.
*H04L 29/06*    (2006.01)
*G06F 21/31*    (2013.01)
(Continued)

(52) U.S. Cl.
CPC ............ *H04L 63/083* (2013.01); *G06F 21/31* (2013.01); *G06F 21/34* (2013.01); *G06F 21/44* (2013.01);
(Continued)

(58) Field of Classification Search
CPC ... H04L 63/083; H04L 63/08; H04L 63/0853; H04L 63/0876; G06F 21/31; G06F 21/34; G06F 21/44; H04M 3/42; H04W 12/06
See application file for complete search history.

(56) References Cited

U.S. PATENT DOCUMENTS

2010/0313242 A1    12/2010  Sato
2012/0330769 A1*   12/2012  Arceo ................... G06Q 20/32
                                                          705/21

FOREIGN PATENT DOCUMENTS

CN    102467731 A    5/2012
JP    2000-238476 A  9/2000
(Continued)

OTHER PUBLICATIONS

Oct. 21, 2014 International Search Report issued in International Patent Application No. PCT/JP2014/070149.
(Continued)

*Primary Examiner* — Oleg Korsak
(74) *Attorney, Agent, or Firm* — Oliff PLC

(57) ABSTRACT

An authentication information management system includes an information processing terminal that transmits check target authentication information and an authentication information management apparatus. The information processing terminal includes a transmission unit that transmits account identification information used to identify registered authentication information. The authentication information management apparatus includes a receiving unit that receives the account identification information transmitted from the information processing terminal, and an association unit that associates terminal identification information used to identify the information processing terminal with the registered authentication information identified using the received account identification information. In a case where check target authentication information has been transmit- (Continued)

ted, authentication is performed in accordance with whether the transmitted check target authentication information corresponds to the registered authentication information with which the terminal identification information used to identify the information processing terminal is associated.

15 Claims, 10 Drawing Sheets

(51) Int. Cl.
G06F 21/44 (2013.01)
H04M 3/42 (2006.01)
H04W 12/06 (2009.01)
G06F 21/34 (2013.01)

(52) U.S. Cl.
CPC .......... *H04L 63/08* (2013.01); *H04L 63/0853* (2013.01); *H04L 63/0876* (2013.01); *H04M 3/42* (2013.01); *H04W 12/06* (2013.01); *H04M 3/42059* (2013.01)

(56) References Cited

FOREIGN PATENT DOCUMENTS

| | | |
|---|---|---|
| JP | 2001-277761 A | 10/2001 |
| JP | 2004-005619 A | 1/2004 |
| JP | 2004-110431 A | 4/2004 |
| JP | 2005-092841 A | 4/2005 |
| JP | 2007-280173 A | 10/2007 |
| JP | 2013-125465 A | 6/2013 |
| WO | 2010/093683 A2 | 8/2010 |

OTHER PUBLICATIONS

Jun. 28, 2017 Extended Search Report issued in European Patent Application No. 14885626.3.
Mar. 29, 2017 Office Action issued in Japanese Patent Application No. 2014-047107.
Mar. 29, 2018 Office Action issued in Chinese Patent Application No. 201480067836.1.

* cited by examiner

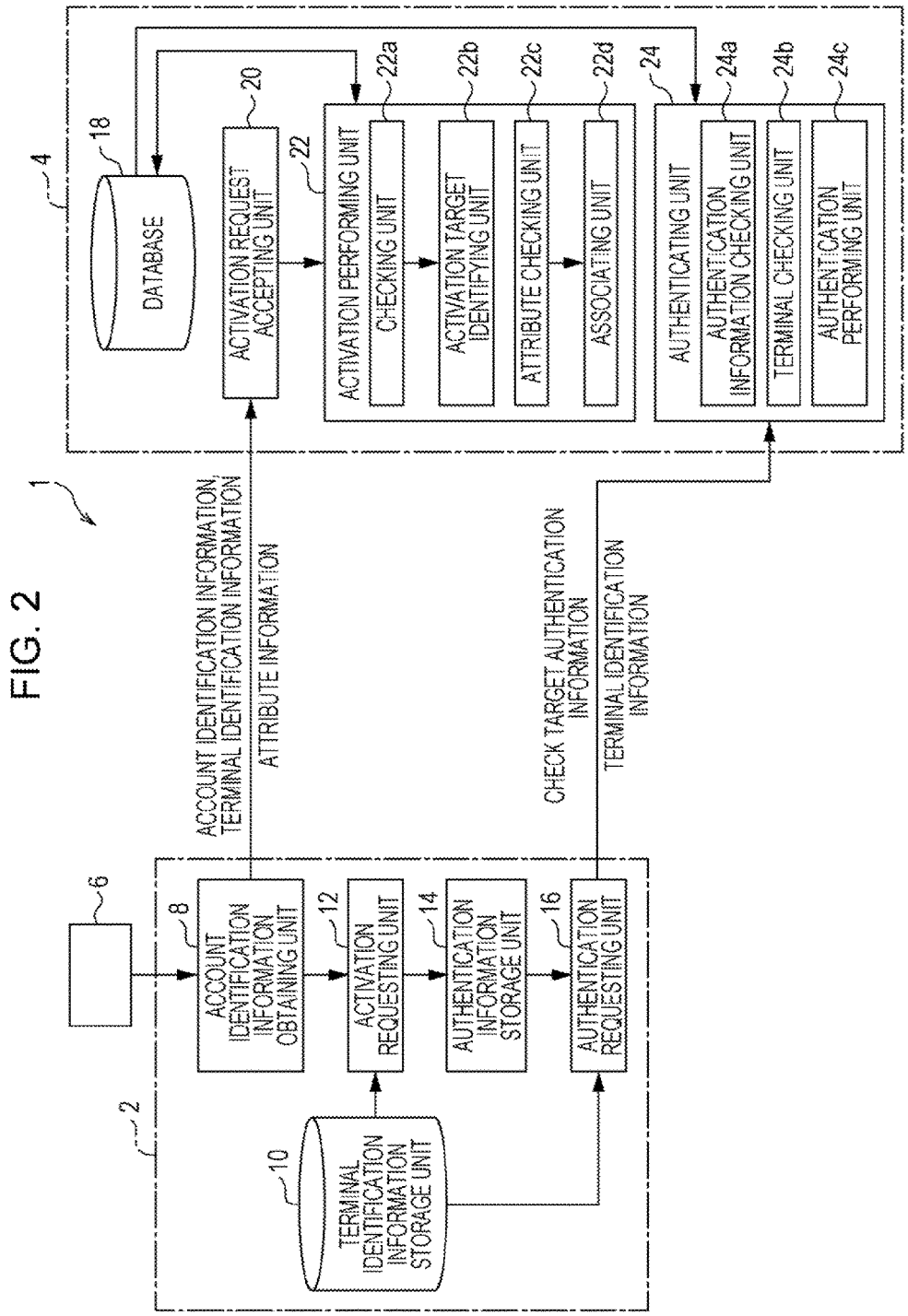

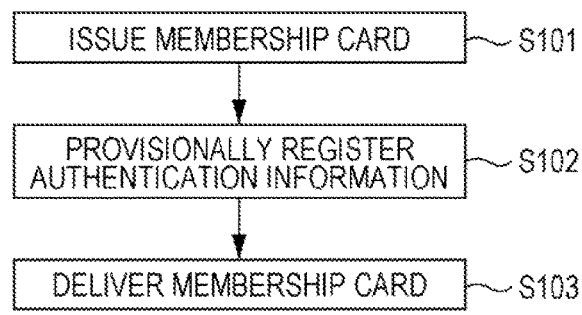

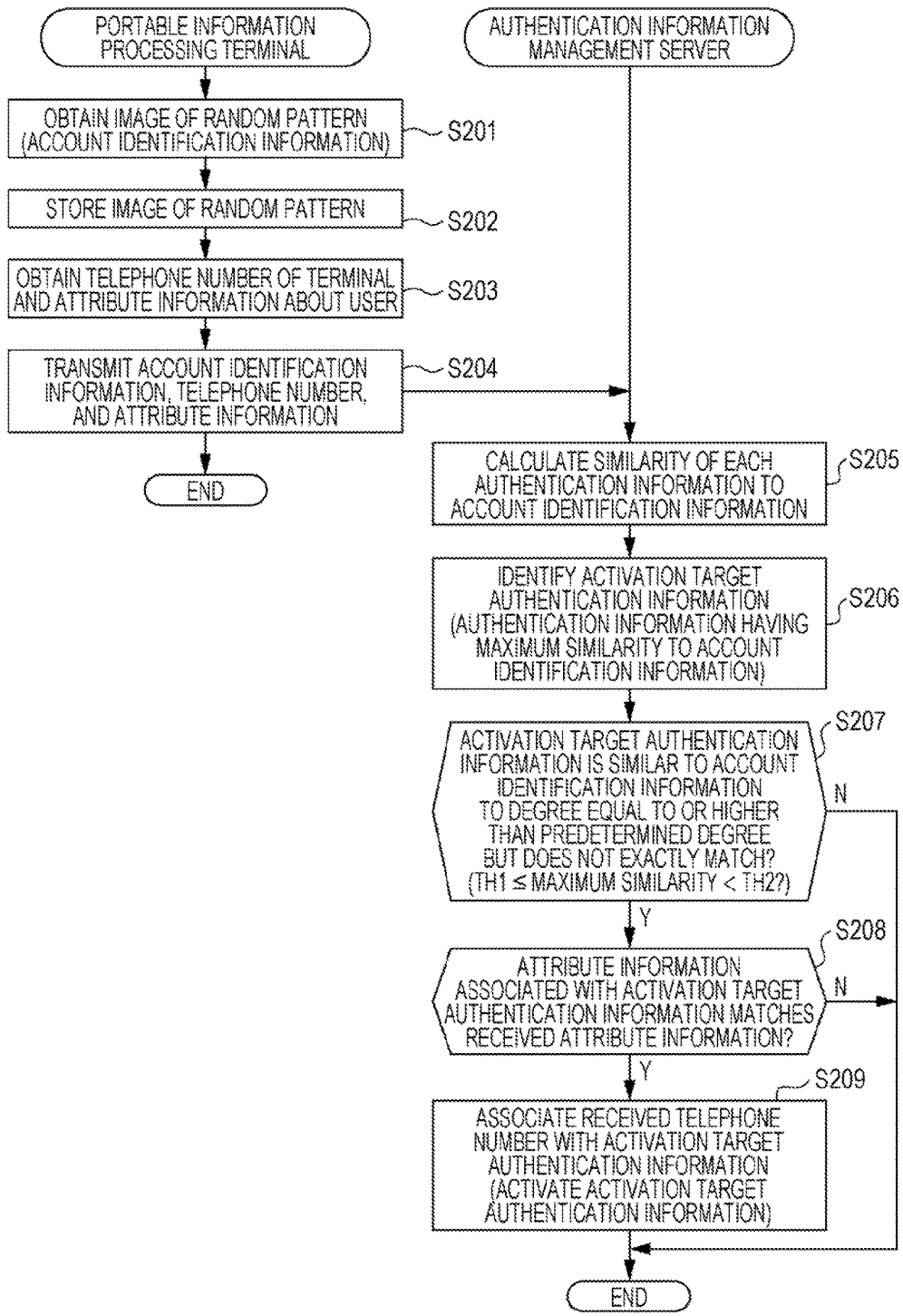

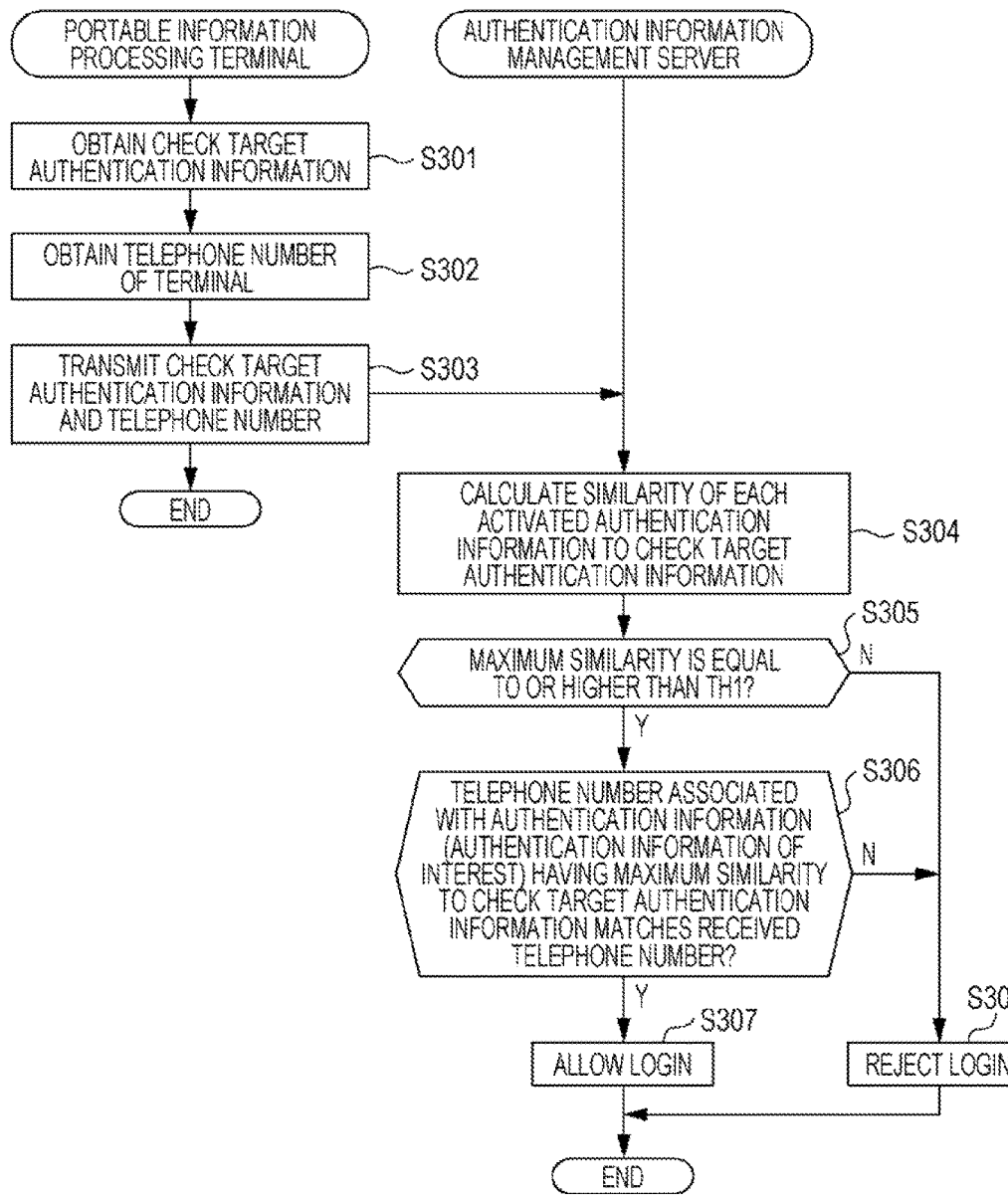

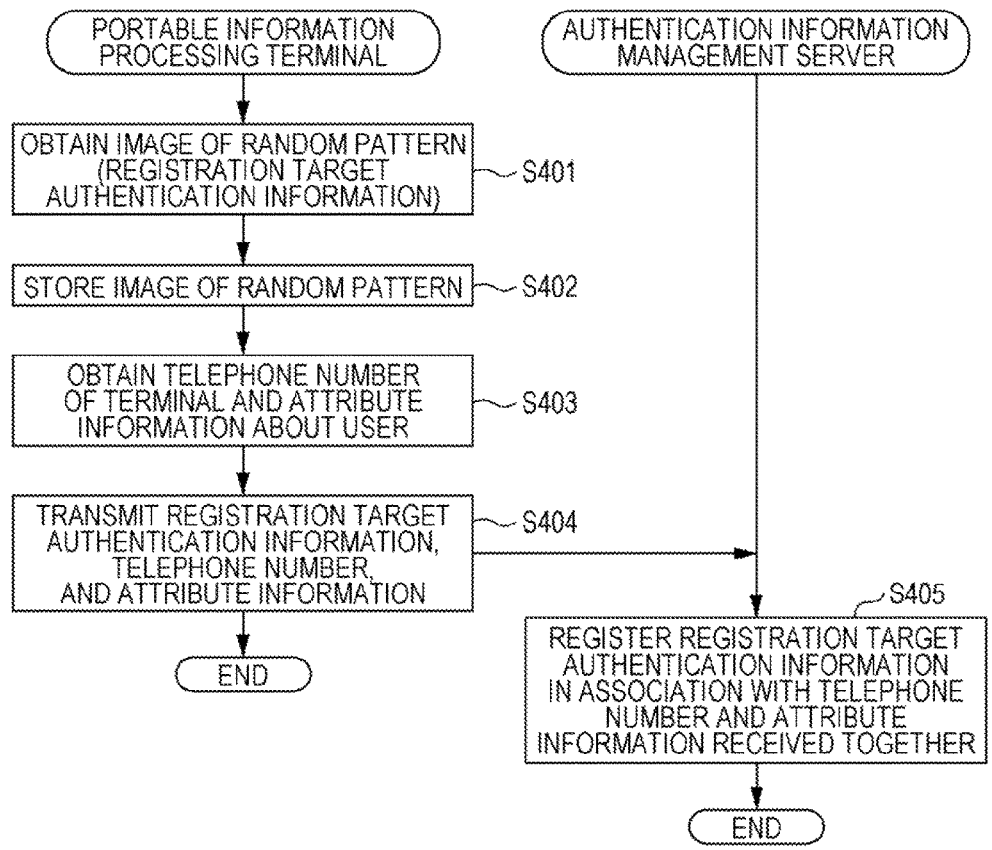

AUTHENTICATION INFORMATION MANAGEMENT SYSTEM, AUTHENTICATION INFORMATION MANAGEMENT APPARATUS, RECORDING MEDIUM, AND AUTHENTICATION INFORMATION MANAGEMENT METHOD

CROSS REFERENCE TO RELATED APPLICATION

This is a continuation of International Application No. PCT/JP2014/070149 filed on Jul. 31, 2014, and claims priority from Japanese Patent Application No. 2014-047107, filed on Mar. 11, 2014.

BACKGROUND

Technical Field

The present invention relates to an authentication information management system, an authentication information management apparatus, a recording medium, and an authentication information management method.

Related Art

Online services, such as Internet shopping, are used by a number of users. On many online service sites, a user is requested to perform preparatory operations before using online services. For example, a user is requested to register authentication information. For example, a user is requested to validate (that is, activate) provisionally registered authentication information. The user can log in to an online service site only after performing such preparatory operations, and can use online services by inputting authentication information into any information processing terminal. As authentication information, a character string, an image, or the like is often used.

SUMMARY

According to an aspect of the invention, there is provided an authentication information management system includes an information processing terminal that transmits check target authentication information and an authentication information management apparatus. The information processing terminal includes a transmission unit that transmits account identification information used to identify registered authentication information. The authentication information management apparatus includes a receiving unit that receives the account identification information transmitted from the information processing terminal, and an association unit that associates terminal identification information used to identify the information processing terminal with the registered authentication information identified using the received account identification information. In a case where check target authentication information has been transmitted, authentication is performed in accordance with whether the transmitted check target authentication information corresponds to the registered authentication information with which the terminal identification information used to identify the information processing terminal is associated.

BRIEF DESCRIPTION OF DRAWINGS

Exemplary embodiment(s) of the present invention will be described in detail based on the following figures, wherein:

FIG. 2 is a functional block diagram illustrating function groups implemented in the authentication information management system in a first embodiment;

FIG. 3 is a diagram for describing a flow of operations performed by a service provider;

FIG. 4 is a diagram illustrating content stored in a database;

FIG. 5 is a diagram illustrating a record stored in the database in a case of provisional registration of authentication information;

FIG. 6 is a flowchart illustrating a process performed by a portable information processing terminal on which an activation operation has been performed and by an authentication information management server;

FIG. 7 is a flowchart illustrating a process performed by the portable information processing terminal on which a login operation has been performed and by the authentication information management server;

FIG. 12 is a flowchart illustrating a process performed by the portable information processing terminal on which a registration operation has been performed and by the authentication information management server; and FIG. 13 is a diagram illustrating a record stored in the database.

DETAILED DESCRIPTION

Hereinafter, exemplary embodiments of the present invention will be described in detail with reference to the drawings.

Figure 1:
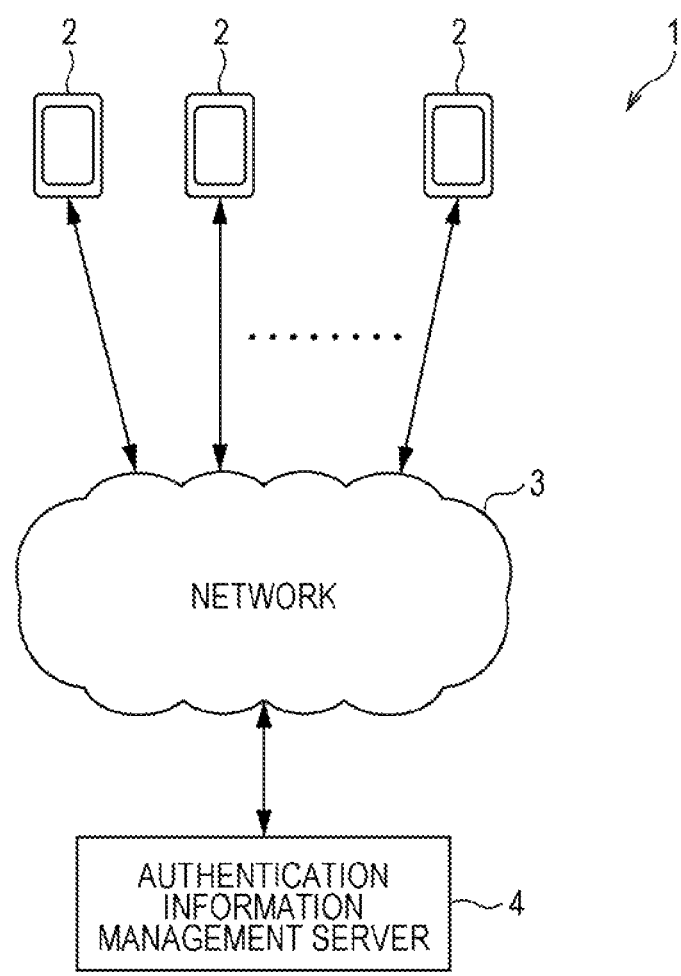
FIG. 1 is a diagram illustrating a configuration of an authentication information management system in embodiments of the present invention.

FIG. 1 is a diagram illustrating a configuration of an authentication information management system 1 in embodiments of the present invention. As illustrated in FIG. 1, the authentication information management system 1 includes an authentication information management server 4. The authentication information management server 4 is a server computer system that includes a microprocessor, a memory, a hard disk, a keyboard, a display, a network interface, and so on, and is administered by a service provider that operates an online service site. The memory stores therein an authentication information management program read from the hard disk as needed, and the microprocessor performs various types of information processing in accordance with the authentication information management program stored in the memory. Here, although the hard disk is used to supply the authentication information management program, a computer-readable information storage medium, such as a CD-ROM or a DVD, may be used. The authentication information management program may be supplied remotely over a communication network, such as the Internet.

The authentication information management system 1 includes at least one portable information processing terminal 2. The portable information processing terminal 2 is a portable personal computer that includes a microprocessor, a memory, an auxiliary storage device (for example, a flash memory), a touchscreen, a built-in digital camera, a network interface, and so on, and is a smartphone here. The memory stores therein an application program supplied by the service provider, and the microprocessor performs various types of information processing in accordance with the application program. The application program may be supplied over a communication network, such as the Internet, or may be supplied using the above-described computer-readable information storage medium.

As illustrated in FIG. 1, the portable information processing terminal 2 and the authentication information management server 4 are connected to a network 3, and therefore, the portable information processing terminal 2 and the authentication information management server 4 can exchange data over the network.

First Embodiment

FIG. 2 is a functional block diagram illustrating function groups implemented in the authentication information management system 1 in the first embodiment. In the authentication information management system 1, an account identification information obtaining unit 8, a terminal identification information storage unit 10, an activation requesting unit 12, an authentication information storage unit 14, and an authentication requesting unit 16 are implemented in the portable information processing terminal 2. In the authentication information management server 4, a database 18, an activation request accepting unit 20, an activation performing unit 22, and an authenticating unit 24 are implemented. The database 18 may be included in a database server separate from the authentication information management server 4. The authenticating unit 24 may be implemented in a server separate from the authentication information management server 4.

Here, a flow of operations performed by the service provider is described with reference to FIG. 3. In the authentication information management system 1, the service provider issues a membership card 6 (see FIG. 2) that is delivered to a user, in response to a request from the user (S101). Here, no designs or characters are printed on the membership card 6, and therefore, the membership card 6 looks like a simple card. The service provider provisionally registers authentication information and attribute information about the user in the database 18 (S102). The authentication information in this case is specific information that is obtained from the issued membership card 6 and that is specific to the membership card 6, and specifically is an image of a random pattern that appears on the surface of the membership card 6, the image being captured by the service provider using a digital camera. The random pattern is a pattern formed of fibers or the like that constitute the membership card 6. The attribute information represents an attribute of the user (for example, the user's date of birth, an image of the user's fingerprint, or the like). Encrypted data of the image of the random pattern may be provisionally registered as the authentication information instead of the image itself.

FIG. 4 is a diagram illustrating content stored in the database 18. Registered authentication information is stored in the database 18. Attribute information about the user is stored in association with the registered authentication information. There are two types of registered authentication information, namely, activated authentication information and provisionally registered authentication information (non-activated authentication information). At least one piece of terminal identification information used to identify the portable information processing terminal 2 is stored in association with the activated authentication information. Here, the telephone number of the portable information processing terminal 2 is used as the terminal identification information. The terminal identification information may be any information as long as the portable information processing terminal 2 can be uniquely identified using the information, and may be a device ID specific to the portable information processing terminal 2, for example. In FIG. 4, authentication information A and authentication information B are activated authentication information. On the other hand, provisionally registered authentication information is associated with no, terminal identification information. In FIG. 4, authentication information C is provisionally registered authentication information. When terminal identification information is associated with provisionally registered authentication information, the provisionally registered authentication information is activated and changes to activated authentication information.

In S102 (see FIG. 3), a record that includes authentication information and attribute information about the user is stored in the database 18. FIG. 5 illustrates a record stored in the database 18 in S102. In FIG. 5, authentication information about a user is represented by authentication information X, and attribute information about the user is represented by attribute information X.

When authentication information has been provisionally registered, the service provider delivers the membership card 6 to the user by mail, for example (S103). The user who has received the membership card 6 performs an activation operation in which the user captures an image of the surface of the membership card 6 using the built-in digital camera of the users portable information processing terminal 2, and activates the provisionally registered authentication information.

In the authentication information management system 1, in order to activate provisionally registered authentication information, the account identification information obtaining unit 8, the terminal identification information storage unit 10, the activation requesting unit 12, and the authentication information storage unit 14 described above are implemented in the portable information processing terminal 2, and the activation request accepting unit 20 and the activation performing unit 22 are implemented in the authentication information management server 4, as illustrated in FIG. 2. The terminal identification information storage unit 10 and the authentication information storage unit 14 are implemented as the auxiliary storage device. On the terminal identification information storage unit 10, the telephone number of the portable information processing terminal 2 is stored in advance as terminal identification information used to identify the portable information processing terminal 2. Attribute information about the user is also stored in advance.

Hereinafter, functions implemented by the portable information processing terminal 2 are described. The account identification information obtaining unit 8 is implemented as the microprocessor that operates in accordance with the application program described above, and obtains account identification information used to identify authentication information that is stored in the database 18. Specifically, the account identification information obtaining unit 8 obtains, as account identification information, specific information that is obtained from the membership card 6 in response to an activation operation, the membership card 6 having been delivered to the user of the portable information processing terminal 2, and that is specific to the membership card 6. Here, an image of the random pattern captured by the built-in digital camera is obtained as account identification information. The activation requesting unit 12 is implemented as the microprocessor that operates in accordance with the application program described above, and stores the account identification information obtained by the account identification information obtaining unit 8 in the authentication information storage unit 14 as check target authentication information when an activation operation has been performed. The activation requesting unit 12 transmits, to the activation request accepting unit 20, the account identification information together with the terminal identification information and attribute information stored in the terminal identification information storage unit 10. In doing so, a request for activation of activation target authentication information that is identified using the account identification information is made to the authentication information management server 4.

Next, functions implemented by the authentication information management server 4 are described. The activation request accepting, unit 20 is implemented as the network interface, and receives the account identification information, attribute information, and terminal identification information transmitted from the portable information processing terminal 2. The activation performing unit 22 stores, in the database 18, the terminal identification information used to identify the portable information processing terminal 2 that is the transmission source of the account identification information in association with activation target authentication information that is identified using the received account identification information to thereby activate the authentication information.

Specifically, the activation performing unit 22 is implemented as the microprocessor that operates in accordance with the authentication information management program described above, and includes a checking unit 22a, an activation target identifying unit 22b, an attribute checking unit 22c, and an associating unit 22d. The checking unit 22a checks the account identification information (the image of the random pattern) against each piece of authentication information (an image of each random pattern) stored in the database 18. In doing so, the result of checking the account identification information against each piece of authentication information is obtained. Here, the similarity of each piece of authentication information to the account identification information is obtained as a check result. The activation target identifying unit 22b identifies activation target authentication information among pieces of authentication information stored in the database 18 on the basis of the check result. Here, the activation target identifying unit 22b identifies authentication information having the maximum similarity to the account identification information as activation target authentication information. The attribute checking unit 22c checks attribute information associated with the activation target authentication information against attribute information about the user of the portable information processing terminal 2 that is the transmission source of the account identification information. That is, the attribute checking unit 22c checks attribute information associated with the activation target authentication information against the attribute information received together with the account identification information. Only in a case where the pieces of attribute information match, the associating unit 22d stores the terminal identification information received together with the account identification information in the database 18 in association with the activation target authentication information. In a case where the activation target authentication information is provisionally registered authentication information, the provisionally registered authentication information is activated. In a case where the user of the portable information processing terminal 2 has activated the activation target authentication information using another portable information processing terminal 2, and the activation target authentication information is activated authentication information, the terminal identification information is newly associated with the activation target authentication information.

FIG. 6 is a flowchart illustrating a process performed by the portable information processing terminal 2 on which an activation operation has been performed and by the authentication information management server 4 in a case where the activation operation has been performed. First, in the portable information processing terminal 2, the microprocessor obtains an image of the random pattern captured by the built-in digital camera as account identification information (S201). The microprocessor stores the image of the random pattern obtained in S201 in the auxiliary storage device as check target authentication information (S202). The microprocessor reads and obtains, from the auxiliary storage device, the telephone number of the terminal and, attribute information about the user (S203), and transmits, to the authentication information management server 4, the account identification information obtained in S201 and the telephone number and attribute information obtained in S203 (S204).

In the authentication information management server 4 that has received the account identification information and so on, the microprocessor calculates the similarity of each piece of authentication information (an image of each random pattern) stored in the database 18 to the account identification information (the image of the random pattern) (S205).

The microprocessor identifies a piece of authentication information having the maximum similarity to the account identification information as activation target authentication information (S206), and determines whether the activation target authentication information is similar to the account identification information to a degree equal to or higher than a predetermined degree but does not exactly match the account identification information (S207). That is, in S207, the microprocessor determines whether the similarity between the account identification information and the activation target authentication information is equal to or higher than a threshold TH1 and lower than a threshold TH2 (TH2>TH1). If the similarity between the account identification information and the activation target authentication information is equal to or higher than the threshold TH1 and lower than the threshold TH2 (S207: Y), the microprocessor checks attribute information associated with the activation target authentication information against the attribute information received together with the account identification information, and determines whether the pieces of attribute information match (S208). In S208, it is determined whether the request for activation has been made by the rightful owner of the membership card 6. If the pieces of attribute information match (S208: Y), the microprocessor stores the telephone number received together with the account identification information in the database 18 in association with the activation target authentication information (S209). If the activation target authentication information is provisionally registered authentication information, the activation target authentication information is consequently activated.

Note that, if the similarity between the account identification information and the activation target authentication information is lower than the threshold TH1 (S207: N), S209 is skipped because authentication information that is similar to the account identification information to a degree equal to or higher than the predetermined degree is not present. If the account identification information and the activation target authentication information exactly match (the maximum similarity is equal to or higher than the threshold TH2) (S207: N), S209 is also skipped because there is a possibility that the activation target authentication information has been stolen from the database 18, for example. If the attribute information associated with the activation target authentication information is different from the attribute information received together with the account identification information (S208: N), S209 is also skipped because there is a possibility that the request for activation has been made by a user who is not the rightful owner of the membership card 6 (a user who has stolen the membership card 6, for example).

In doing so, the user activates the authentication information. As a result, the user can log in to the online service site. The user logs in to the online service site by performing a login operation.

As described above, in the authentication information management system 1, terminal identification information about the portable information processing terminal 2 that has requested activation is associated with activation target authentication information. Therefore, the portable information processing terminal 2 via which a login to the online service site can be performed is limited to the portable information processing terminal 2 that has been used to activate the authentication information. That is, in order to limit the portable information processing terminal 2 via which a login to the online service site can be performed to the portable information processing terminal 2 that has been used to activate the authentication information, the authentication requesting unit 16 is implemented in the portable information processing terminal 2, and the authenticating unit 24 is implemented in the authentication information management server 4.

Hereinafter, the authentication requesting unit 16 and the authenticating unit 24 are described with reference to FIG. 2. The authentication requesting unit 16 is implemented as the microprocessor that operates in accordance with the application program described above, and obtains check target authentication information. Here, when a login operation has been performed, the authentication requesting unit 16 obtains, as check target authentication information, specific information obtained by the portable information processing terminal 2 from the membership card 6. Specifically, the authentication requesting unit 16 obtains check target authentication information stored in the authentication information storage, unit 14 in principle. However, in a case where the user has captured an image of the random pattern using the built-in digital camera in the login operation, the authentication requesting unit 16 obtains the captured image of the random pattern as check target authentication information.

The authentication requesting unit 16 transmits, to the authenticating unit 24, the obtained check target authentication information together with the terminal identification information stored in the terminal identification information storage unit 10. In doing so, an authentication request is made to the authentication information management server 4.

The authenticating unit 24 is implemented as the microprocessor that operates in accordance with the authentication information management program, and performs an authentication process in accordance with whether the check target authentication information corresponds to authentication information associated with the terminal identification information received together with the check target authentication information, in other words, whether the terminal identification information received together with the check target authentication information is already associated with authentication information that corresponds to the check target authentication information. Specifically, the authenticating unit 24 includes an authentication information checking unit 24a, a terminal checking unit 24b, and an authentication performing unit 24c. The authentication information checking unit 24a checks the check target authentication information (the image of the random pattern) against activated authentication information (an image of a random pattern). In a case where encrypted data of an image of a random pattern is stored in the database 18 as authentication information, the check target authentication information (the image of the random pattern) may be encrypted, and the encrypted check target authentication information may be checked against activated authentication information. The terminal checking unit 24b checks the terminal identification information used to identify the portable information processing terminal 2 that is the transmission source of the check target authentication information against terminal identification information associated with activated authentication information. That is, the terminal checking unit 24b checks the terminal identification information received together with the check target authentication information against terminal identification information associated with activated authentication information. The authentication performing unit 24c determines whether the check target authentication information corresponds to activated authentication information associated with the terminal identification information received together with the check target authentication information on the basis of the result of checking by the authentication information checking unit 24a and the result of checking by the terminal checking unit 24b, and performs an authentication process, that is, allows the login to the online service site or rejects the login, for example, on the basis of the result of determination.

FIG. 7 is a flowchart illustrating a process performed by the portable information processing terminal 2 on which a login operation has been performed and by the authentication information management server 4 in a case where the login operation has been performed. First, in the portable information processing terminal 2, the microprocessor obtains, as check target authentication information, an image of the random pattern captured by the built-in digital camera or at least part of the image of the random pattern stored in the auxiliary storage device (S301). The microprocessor reads the telephone number of the terminal stored in the auxiliary storage device (S302). The microprocessor transmits, to the authentication information management server 4, the check target authentication information together with the telephone number of the terminal (S303).

In the authentication information management server 4 that has received the check target authentication information and so on, the microprocessor calculates the similarity of each piece of activated authentication information (an image of each random pattern) to the check target authentication information (the image of the random pattern) (S304). That is, the microprocessor calculates the similarity of each piece of authentication information associated with at least one telephone number to the check target authentication information in S304. The microprocessor determines whether the maximum similarity is equal to or higher than the threshold TH1 (S305). If the maximum similarity is equal to or higher than the threshold TH1 (S305: Y), the microprocessor determines whether a telephone number associated with authentication information (hereinafter referred to as authentication information of interest) having the maximum similarity to the check target authentication information matches the telephone number received together with the check target authentication information (S306). If the telephone numbers match (S306: Y), the microprocessor allows the login to the online service site (S307). That is, the user is allowed to use online services in S307.

On the other hand, if the telephone numbers do not match (S306: N), the microprocessor rejects the login in order to limit the portable information processing terminal 2 via which a login can be performed to the portable information processing terminal 2 that has been used by the user to activate the authentication information (S308). Note that, if the maximum similarity is lower than the threshold TH1 (S305: N), the login is also rejected because authentication information that is similar to the check target authentication information to a degree equal to or higher than the predetermined degree is not present.

Conclusion of First Embodiment

As described above, in the first embodiment, the activation performing unit 22 associates terminal identification information used to identify the portable information processing terminal 2 that has requested the activation with authentication information identified using account identification information. Therefore, the portable information processing terminal 2 via which a login to the online service site can be performed is limited to the portable information processing terminal 2 that has been used by a user in activation. Accordingly, it is possible to prevent another user who has obtained authentication information about the user (for example, another user who has stolen the membership card 6) from performing a login using the other users portable information processing terminal 2 while masquerading as the user.

Furthermore, attribute information about a user is associated in advance with authentication information, and the attribute information is checked against attribute information of the user of the portable information processing terminal 2 that has requested activation. Accordingly, it is possible to prevent another user who has obtained account identification information (for example, another user who has stolen the membership card 6) from performing activation while masquerading as the user. As a result, only terminal identification information about the portable information processing terminal 2 owned by a user is associated with authentication information about the user, and therefore, it is possible to prevent another user from performing a login while masquerading as the user, with more certainty.

Note that checking of attribute information may be omitted. That is, the attribute checking unit 22c illustrated in FIG. 2 and S208 illustrated in FIG. 6 may be omitted. In this case, activation by another user who masquerades as a user may be prevented as in a modification described below. Hereinafter, the modification is described.

Figure 8:
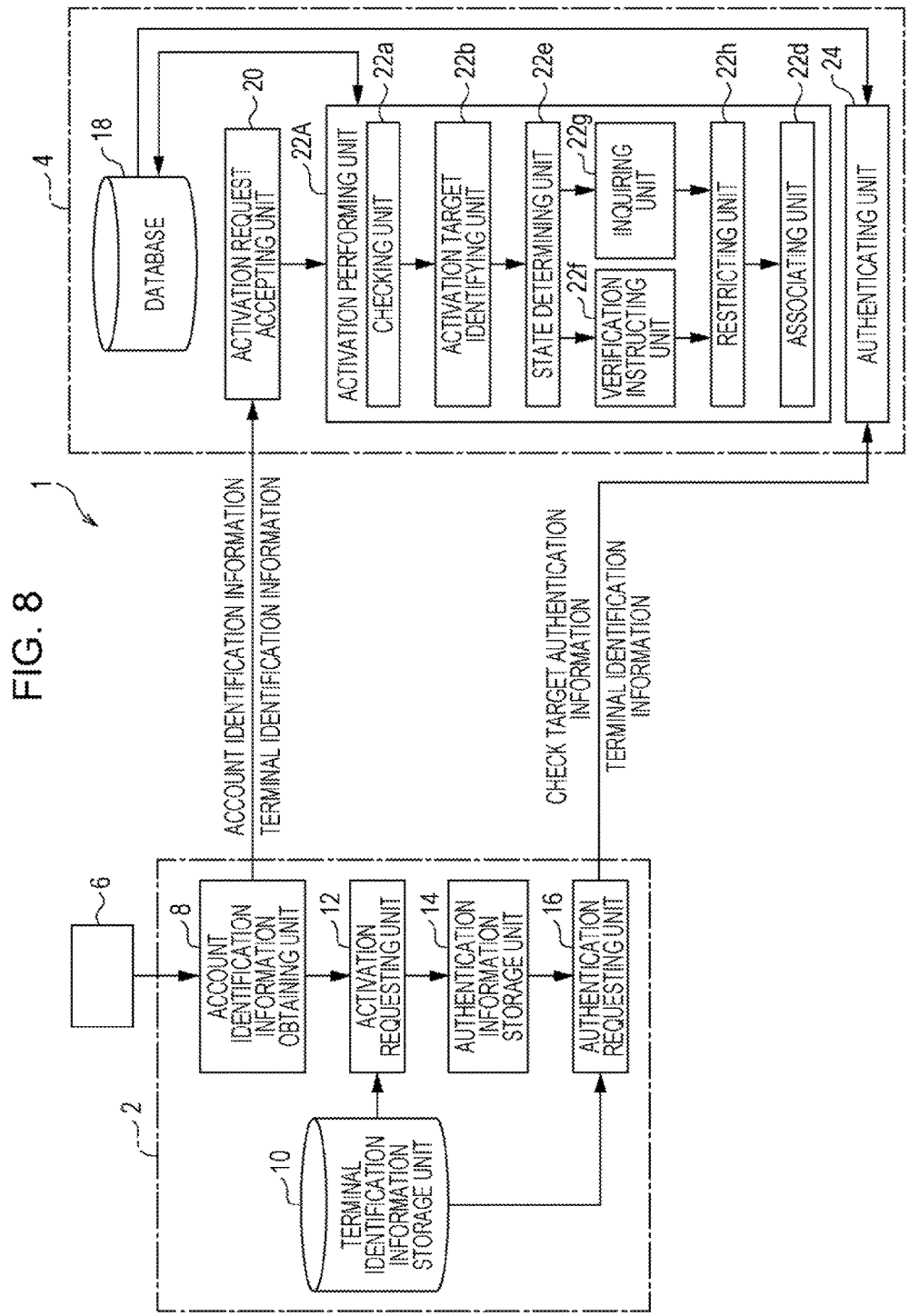
FIG. 8 is a functional block diagram illustrating function groups implemented in the authentication information management system in a modification of the first embodiment.

FIG. 8 is a functional block diagram illustrating function groups implemented in the authentication information management system 1 in the modification of the first embodiment. In the modification, the activation requesting unit 12 transmits only terminal identification information together with account identification information. Furthermore, an activation performing unit 22A is implemented instead of the activation performing unit 22 illustrated in FIG. 2. The activation performing unit 22A further includes a state determining unit 22e, a verification instructing unit 22f, an inquiring unit 22g, and a restricting unit 22h.

The state determining unit 22e determines whether activation target authentication information has been activated. That is, the state determining unit 22e determines whether at least one piece of terminal identification information is associated with activation target authentication information. In a case where activation target authentication information has not been activated, the verification instructing unit 22f instructs the service provider to verify the content of attribute information associated with the activation target authentication information.

In a case where activation target authentication information has been activated, the inquiring unit 22g transmits, to the portable information processing terminal 2 identified using terminal identification information associated with the activation target authentication information, inquiry information that includes terminal identification information used to identify the portable information processing terminal 2 that is the transmission source of the account identification information (the terminal identification information received together with the account identification information).

The restricting unit 22h restricts, under a predetermined condition, the associating unit 22d from storing the terminal identification information used to identify the portable information processing terminal 2 that is the transmission source of the account identification information in the database 18 in association with activation target authentication information. That is, in the case where activation target authentication information has not been activated, the restricting unit 22h puts a restriction when the service provider has performed a predetermined prohibited operation. On the other hand, in the case where activation target authentication information has been activated, the restricting unit 22h puts a restriction when the user of the portable information processing terminal 2 that is the transmission destination of the inquiry information has performed a predetermined prohibited operation.

Figure 9:
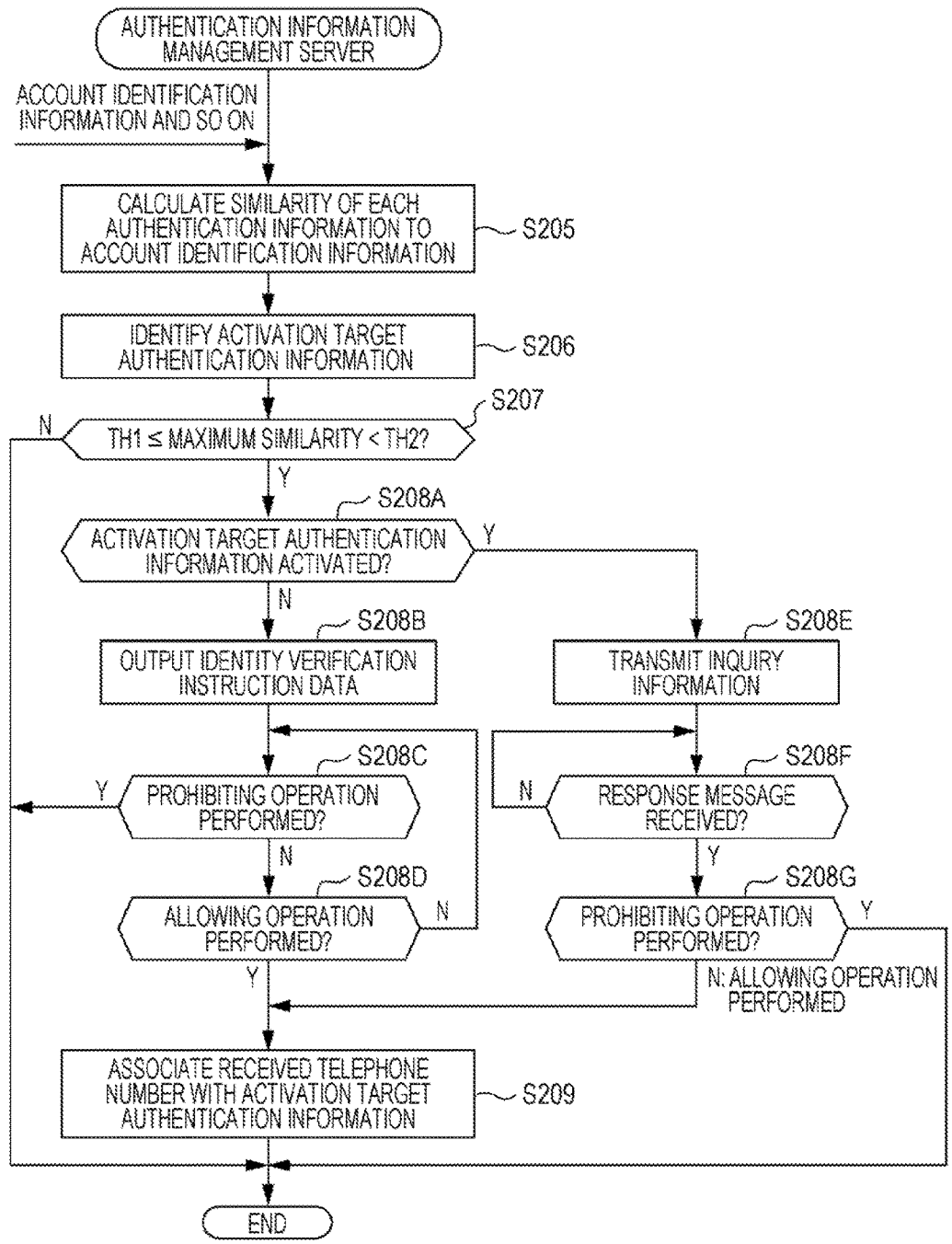
FIG. 9 is a flowchart illustrating a process performed by the authentication information management server that has received account identification information and so on in the modification.

FIG. 9 is a flowchart illustrating a process performed by the authentication information management server 4 that has received account identification information and so on in the modification. First, the microprocessor performs steps S204 to S207 described above.

Note that, if the similarity between the account identification information and activation target authentication information is equal to or higher than the threshold TH1 and lower than the threshold TH2 (S207: Y), the microprocessor determines whether the activation target authentication information has been activated (S208A). That is, in S208A, it is determined whether at least one telephone number is associated with the activation target authentication information.

If the activation target authentication information has not been activated (S208A: N), the microprocessor outputs identity verification instruction data for instructing the service provider to verify the content of the attribute information associated with the activation target authentication information (S208B). Specifically, the microprocessor displays, on the display, the telephone number of the portable information processing terminal 2 that has requested activation (that is, the telephone number received together with the account identification information) as identity verification instruction data. The service provider makes a call at the telephone number displayed on the display. In a case where the content orally provided by the user who has requested activation matches the content of the attribute information associated with the activation target authentication information, the service provider performs an allowing operation of allowing activation. In a case where the pieces of content are different from each other, the service provider performs a prohibiting operation of prohibiting activation. In the modification, after S208B, it is determined which of the allowing operation and the prohibiting operation has been performed by the service provider (S208C and S208D). If the allowing operation has been performed (S208D: Y), step S209 is performed. On the other hand, if the prohibiting operation has been performed (S208C: Y), step S209 is not performed and is skipped.

Figure 10:
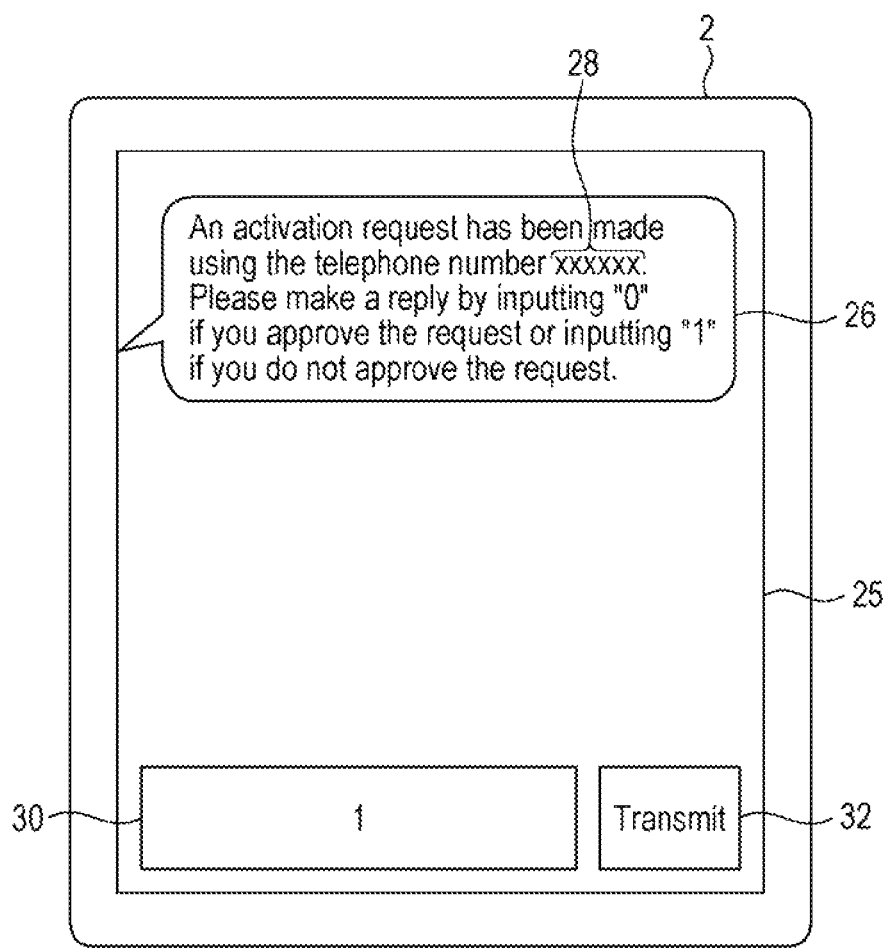
FIG. 10 is a diagram illustrating an example of inquiry information displayed on the portable information processing terminal that is the transmission destination of the inquiry information.

If the activation target authentication information has been activated (S208A: Y), the microprocessor transmits, as inquiry information, a short message addressed to a telephone number associated with the activation target authentication information, the short message including the telephone number of the portable information processing terminal 2 that has requested activation (that is, the telephone number received together with the account identification information) (S208E). The inquiry information is displayed on the touchscreen of the portable information processing terminal 2 that is the transmission destination of the inquiry information. FIG. 10 is a diagram illustrating the content displayed on a touchscreen 25 of the portable information processing terminal 2 that is the transmission destination. As illustrated in FIG. 10, inquiry information 26 is displayed on the touchscreen 25. The inquiry information 26 includes a telephone number 28 of the portable information processing terminal 2 that has requested activation. The user who has seen the inquiry information 26 performs an allowing operation in a case where the telephone number 28 is the telephone number of the users portable information processing terminal 2. Specifically, the user inputs "0" into an input field 30 and touches a transmit button 32. On the other hand, in a case where the telephone number 28 is not the telephone number of the users portable information processing terminal 2, the user performs a prohibiting operation. Specifically, the user inputs "1" into the input field 30 and touches the transmit button 32. When the user touches the transmit button 32, a reply message that includes the content input into the input field 30 is returned to the authentication information management server 4 as a response message.

After S208E, it is determined whether the response message has been received (S208F). If the response message that includes "0" has been received (S208G: N), that is, if an allowing operation has been performed on the portable information processing terminal 2 that is the transmission destination, step S209 is performed. On the other hand, if the response message that includes "1" has been received (S208G: Y), that is, if a prohibiting operation has been performed on the portable information processing terminal 2 that is the transmission destination, step S209 is not performed and is skipped.

Also in the modification, it is possible to prevent another user from performing activation while masquerading as a user. As a result, only terminal identification information about the portable information processing terminal 2 owned by a user is associated with authentication information about the user, and therefore, it is possible to prevent another user from performing a login while masquerading as the user, with more certainty.

Second Embodiment

Figure 11:
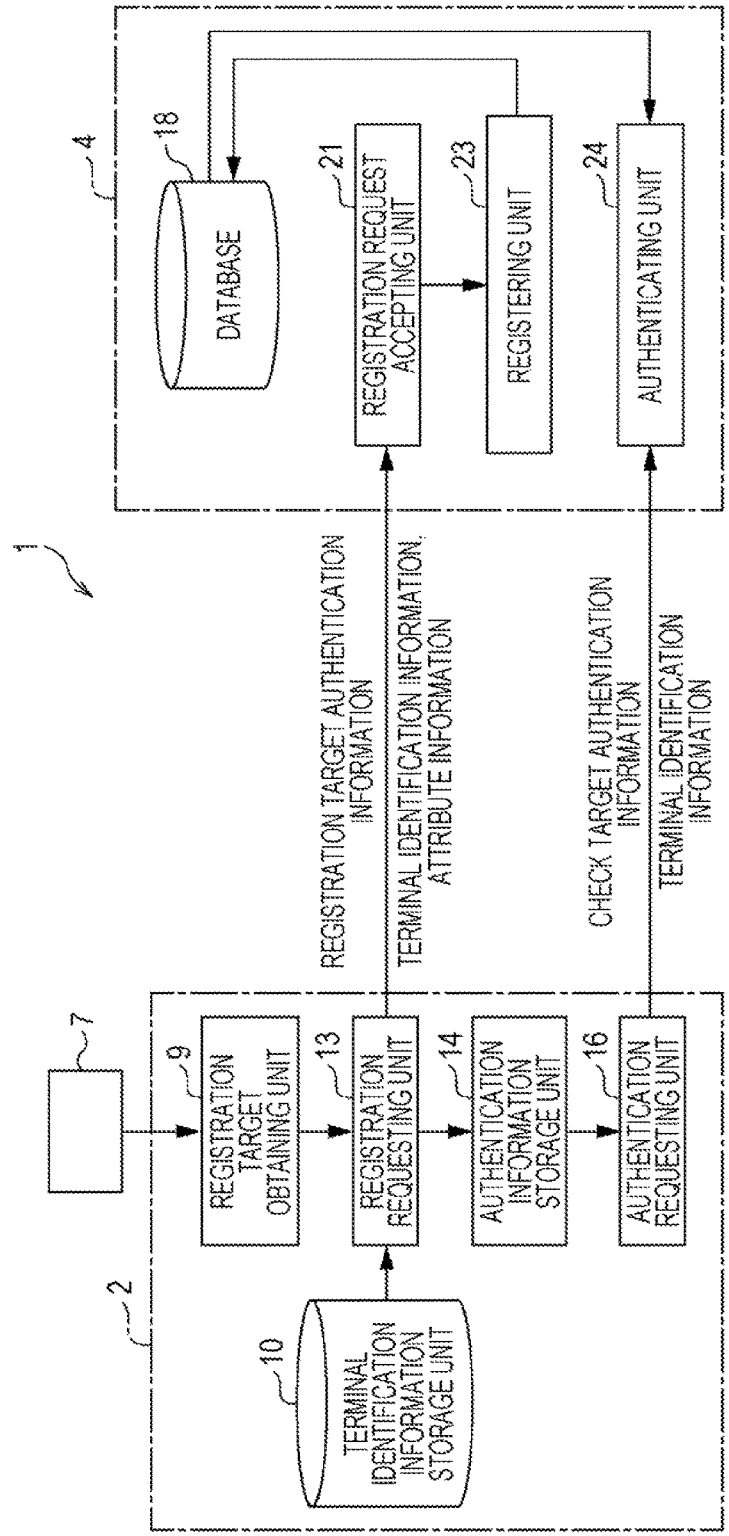
FIG. 11 is a functional block diagram illustrating function groups implemented in an authentication information management system 1 in a second embodiment.

Next, a second embodiment is described. The configuration of the authentication information management system 1 in the second embodiment is similar to that illustrated in FIG. 1. However, function groups implemented in the authentication information management system 1 are different in the second embodiment. FIG. 11 is a functional block diagram illustrating function groups implemented in the authentication information management system 1 in the second embodiment. As illustrated in FIG. 11, in the second embodiment, a registration target obtaining unit 9, the terminal identification information storage unit 10, a registration requesting unit 13, the authentication information storage unit 14, and the authentication requesting unit 16 are implemented in the portable information processing terminal 2. In the authentication information management server 4, the database 18, a registration request accepting unit 21, a registering unit 23, and the authenticating unit 24 are implemented. The database 18 may be included in a database server separate from the authentication information management server 4. The authenticating unit 24 may be implemented in a server separate from the authentication information management server 4.

In the second embodiment, the terminal identification information storage unit 10, the authentication information storage unit 14, and the authentication requesting unit 16 similar to those in the first embodiment are implemented in the portable information processing terminal 2. However, the account identification information obtaining unit 8 and the activation requesting unit 12 are not implemented in the second embodiment, and the registration target obtaining unit 9 and the registration requesting unit 13 are implemented. In the second embodiment, the database 18 and the authenticating unit 24 similar to those in the first embodiment are implemented in the authentication information management server 4. However, the activation request accepting unit 20 and the activation performing unit 22 are not implemented, and the registration request accepting unit 21 and, the registering unit 23 are implemented.

In the first embodiment, the service provider registers authentication information about a user in the database 18. In the second embodiment, issuance of the membership card 6 by the service provider is not performed, and a user registers authentication information in the database 18 by himself/herself. That is, a user performs a registration operation in which the user captures an image of the surface of an object 7 owned by the user (for example, paper selected by the user) using the built-in digital camera of the portable information processing terminal 2, and registers the captured image of a random pattern in the database 18 as registration target authentication information. In the second embodiment, an activation operation is not needed. That is upon registration of authentication information, terminal identification information of the portable information processing terminal 2 is associated with the authentication information, and therefore, the authentication information becomes activated authentication information upon registration.

In the authentication information management system 1, in order to register authentication information, the registration target obtaining unit 9 and the registration requesting unit 13 are implemented in the portable information processing terminal 2, and the registration request accepting unit 21 and the registering unit 23 are implemented in the authentication information management server 4, as illustrated in FIG. 11.

The registration target obtaining unit 9 is implemented as the microprocessor that operates in accordance with the application program described above, and obtains registration target authentication information. Specifically, the registration target obtaining unit 9 obtains specific information that is obtained by the portable information processing terminal 2 from the object 7 in response to a registration operation and that is specific to the object 7 as registration target authentication information. Here, the image of the random pattern captured by the built-in digital camera is obtained as registration target authentication information.

The registration requesting unit 13 is implemented as the microprocessor that operates in accordance with the application program described above, and, when a registration operation has been performed, transmits, to the registration request accepting unit 21, the obtained registration target authentication information together with terminal identification information and attribute information that are stored in the terminal identification information storage unit 10. In doing so, registration of the registration target authentication information is requested to the authentication information management server 4.

The registration request accepting unit 21 is implemented as the network interface, and receives the registration target authentication information, terminal identification information, and attribute information transmitted from the portable information processing terminal 2. The registering unit 23 registers the registration target authentication information in the database 18 in association with terminal identification information used to identify the portable information processing terminal 2 that is the transmission source of the registration target authentication information and attribute information about the user of the portable information processing terminal 2 that s the transmission source. Specifically, the registering unit 23 is implemented as the microprocessor that operates in accordance with the authentication information management program described above, and stores the registration target authentication information in the database 18 in association with the terminal identification information and attribute information received together with the registration target authentication information.

FIG. 12 is a flowchart illustrating a process performed by the portable information processing terminal 2 on which a registration operation has been performed and by the authentication information management server 4 in a case where the registration operation has been performed. First, in the portable information processing terminal 2, the microprocessor obtains an image of the random pattern captured by the built-in digital camera as registration target authentication information (S401). The microprocessor stores the obtained image of the random pattern in the auxiliary storage device (S402). The microprocessor reads and obtains, from the auxiliary storage device, the telephone number of the terminal and attribute information about the user (S403), and transmits, to the authentication information management server 4, the registration target authentication information together with the obtained telephone number and attribute information (S404).

In the authentication information management server 4 that has received the registration target authentication information and so on, the microprocessor stores the registration target authentication information in the database 18 in association with the telephone number and attribute information received together with the registration target authentication information (S405). Specifically, a record that includes the registration target authentication information and the telephone number and attribute information received together with the registration target authentication information is stored in the database 18. FIG. 13 illustrates the record. In FIG. 13, the registration target authentication information is represented by authentication information X, and the attribute information and telephone number received together with the registration target authentication information are respectively represented by attribute information X and a telephone number X.

In doing so, the user registers the authentication information. As a result, the user can log in to the online service site. The user logs in to the online service site by performing a login operation. When a login operation has been performed, the authentication requesting unit 16 obtains, as check target authentication information, specific information obtained by the portable information processing terminal 2 from the object 7. That is, the authentication requesting unit 16 obtains check target authentication information that is stored in the authentication information storage unit 14 in principle. However, in a case where the user has captured an image of the random pattern using the built-in digital camera in the login operation, the authentication requesting unit 16 obtains the captured image of the random pattern as check target authentication information. The authentication requesting unit 16 transmits, to the authenticating unit 24, the obtained check target authentication information together with the terminal identification information stored in the terminal identification information storage unit 10. Then, an authentication process is performed by the authenticating unit 24 as described above. That is, when a login operation has been performed, the process illustrated in FIG. 7 is performed by the portable information processing terminal 2 on which the login operation has been performed and by the authentication information management server 4.

Conclusion of Second Embodiment

As described above, in the second embodiment, the registering unit 23 registers registration target authentication information in the database 18 in association with terminal identification information used to identify the portable information processing terminal 2 that is the transmission source of the registration target authentication information. Therefore, the portable information processing terminal 2 via which a login to the online service site can be performed is limited to the portable information processing terminal 2 that has been used by the user to register authentication information. Accordingly, also in the second embodiment where a user registers authentication information by himself/herself, it is possible to prevent another user who has obtained authentication information about the user (for example, another user who has stolen the object 7) from performing a login using the other users portable information processing terminal 2 while masquerading as the user.

Note that embodiments of the present invention are, not limited to the above-described embodiments.

For example, account identification information may be any type of information. For example, account identification information may be a character string typed and input by a user.

For example, information used as authentication information may be any type of information (for example, a character string). Depending on the type of information used as authentication information, registration target authentication information or check target authentication information may be typed and input by a user.

In the first embodiment, the registration target obtaining unit 9 and the registration requesting unit 13 may be further implemented in the portable information processing terminal 2, and the registration request accepting unit 21 and the registering unit 23 may be further implemented in the authentication information management server 4.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication information management system comprising:
   a three-dimensional random pattern information obtained from an object delivered to a user, the three-dimensional random pattern information including a random pattern that constitutes a surface of the object, and no designs or characters are printed on the object;
   an authentication information management apparatus that: (i) delivers the object to the user; and (ii) registers authentication information about the user before delivering the object to the user;
   an information processing terminal that: (i) captures an image of the random pattern; (ii) obtains from the captured image account identification information that is used to identify the registered authentication information; and (iii) stores the captured image as check target authentication information that is transmitted to the authentication information management apparatus for authentication,
   the information processing terminal including a transmission unit that transmits the account identification information to the authentication information management apparatus,
   the authentication information management apparatus including:
      a receiving unit that receives the account identification information transmitted from the information processing terminal, and
      an association unit that determines whether to associate terminal identification information used to identify the information processing terminal with the registered authentication information identified using the received account identification information, wherein
   when the check target authentication information has been transmitted by the information processing terminal, authentication is performed in accordance with whether the transmitted check target authentication information corresponds to the registered authentication information with which the terminal identification information used to identify the information processing terminal is associated.

2. The authentication information management system according to claim 1, wherein
   the transmission unit transmits the terminal identification information used to identify the information processing terminal together with the account identification information, and
   the association unit associates the terminal identification information received together with the account identification information, with the registered authentication information identified using the received account identification information.

3. The authentication information management system according to claim 1, wherein
   attribute information about a user is associated in advance with the registered authentication information, and
   the association unit does not associate, in accordance with a result of checking attribute information associated with the registered authentication information identified using the received account identification information against attribute information about a user of the information processing terminal, the terminal identification information used to identify the information processing terminal with the registered authentication information.

4. The authentication information management system according to claim 1, wherein
   the transmission unit stores, in a storage unit, the information that is obtained by the information processing terminal from the object after delivery to the user and that is specific to the object, and transmits the information as the account identification information, and
   the information processing terminal transmits the information stored in the storage unit as the check target authentication information.

5. An authentication information management apparatus comprising:
   at least one processor configured to function as:
      a receiving unit that receives account identification information used to identify registered authentication information, the account identification information being determined by a three-dimensional random pattern information provided to a user, the three-dimensional random pattern information including a random pattern that constitutes a surface of the object, and no designs or characters are printed on the object; and
      an association unit that determines whether to associate terminal identification information used to identify an information processing terminal that is a transmission source of the account identification information with the registered authentication information identified using the received account identification information.

6. The authentication information management apparatus according to claim 5, wherein
   attribute information about the user is associated in advance with registered authentication information, and
   the association unit does not associate, in accordance with a result of checking attribute information associated with the registered authentication information identified using the received account identification information against attribute information about a user of the information processing terminal that is the transmission source, the terminal identification information used to identify the information processing terminal that is the transmission source with the registered authentication information.

7. The authentication information management apparatus according to claim 5, further comprising:
a transmitting unit that transmits, when terminal identification information is already associated with the registered authentication information identified using the received account identification information, predetermined inquiry information to an information processing terminal identified using the terminal identification information associated with the registered authentication information, wherein
the association unit does not associate the terminal identification information used to identify the information processing terminal that is the transmission source with the registered authentication information identified using the received account identification information when a predetermined operation is performed on the information processing terminal that is a transmission destination of the inquiry information.

8. An authentication information management system comprising:
a three-dimensional random pattern information obtained from an object delivered to a user, the three-dimensional random pattern information including a random pattern that constitutes a surface of the object, and no designs or characters are printed on the object;
an authentication information management apparatus that: (i) delivers the object to the user; and (ii) registers authentication information about the user before delivering the object to the user;
an information processing terminal that: (i) captures an image of the random pattern; (ii) obtains from the captured image registration target information that is used to identify the registered authentication information; and (iii) stores the captured image as check target authentication information that is transmitted to the authentication information management apparatus for authentication,
the information processing terminal including a transmission unit that transmits the registration target authentication information to the authentication information management apparatus,
the authentication information management apparatus including:
a receiving unit that receives the registration target authentication information transmitted from the information processing terminal, and
a registration unit that registers the received registration target authentication information in association with terminal identification information used to identify the information processing terminal, wherein
when the check target authentication information has been transmitted by the information processing terminal, authentication is performed in accordance with whether the transmitted check target authentication information corresponds to the registered authentication information with which the terminal identification information used to identify the information processing terminal is associated.

9. The authentication information management system according to claim 8, wherein
the transmission unit transmits the terminal identification information used to identify the information processing terminal together with the registration target authentication information, and
the registration unit registers the received registration target authentication information in association with the terminal identification information received together with the registration target authentication information.

10. The authentication information management system according to claim 8, wherein
the transmission unit stores, in a storage unit, information that is obtained by the information processing terminal from the object owned by the user and that is specific to the object, and transmits the information as registration target authentication information, and
the information processing terminal transmits the information stored in the storage unit as check target authentication information.

11. An authentication information management apparatus, comprising:
at least one processor configured to function as:
a receiving unit that receives registration target authentication information determined by a three-dimensional random pattern information, the three-dimensional random pattern information being obtained from an object that is delivered to a user, the three-dimensional random pattern information including a random pattern that constitutes a surface of the object, and no designs or characters are printed on the object; and
a registration unit that registers the received registration target authentication information in association with terminal identification information used to identify an information processing terminal that is a transmission source of the registration target authentication information.

12. A non-transitory computer-readable recording medium storing a program for causing a computer to function as:
a receiving unit that receives account identification information used to identify registered authentication information determined by a three-dimensional random pattern information, the three-dimensional random pattern information being obtained from an object that is delivered to a user, the three-dimensional random pattern information including a random pattern that constitutes a surface of the object, and no designs or characters are printed on the object; and
an association unit that determines whether to associate terminal identification information used to identify an information processing terminal that is a transmission source of the account identification information, with the registered authentication information identified using the received account identification information.

13. A non-transitory computer-readable recording medium storing a program for causing a computer to function as:
a receiving unit that receives registration target authentication information determined by a three-dimensional random pattern information, the three-dimensional random pattern information being obtained from an object that is delivered to a user, the three-dimensional random pattern information including a random pattern that constitutes a surface of the object, and no designs or characters are printed on the object; and
a registration unit that registers the received registration target authentication information in association with terminal identification information used to identify an information processing terminal that is a transmission source of the registration target authentication information.

14. An authentication information management method comprising:

receiving account identification information used to identify registered authentication information determined by a three-dimensional random pattern information, the three-dimensional random pattern information being obtained from an object that is delivered to a user, the three-dimensional random pattern information including a random pattern that constitutes a surface of the object, and no designs or characters are printed on the object; and determining whether to associate terminal identification information used to identify an information processing terminal that is a transmission source of the account identification information, with the registered authentication information identified using the received account identification information.

15. An authentication information management method comprising:

receiving registration target authentication information determined by a three-dimensional random pattern information, the three-dimensional random pattern information being obtained from an object that is delivered to a user, the three-dimensional random pattern information including a random pattern that constitutes a surface of the object, and no designs or characters are printed on the object; and registering the received registration target authentication information in association with terminal identification information used to identify an information processing terminal that is a transmission source of the registration target authentication information.

* * * * *